(No Model.)

J. N. STARK & G. P. BARTLETT.
TRUSS.

No. 316,303. Patented Apr. 21, 1885.

Witnesses.     Inventors.

UNITED STATES PATENT OFFICE.

JAMES N. STARK AND GEORGE P. BARTLETT, OF WOBURN, MASS.

TRUSS.

SPECIFICATION forming part of Letters Patent No. 316,303, dated April 21, 1885.

Application filed May 21, 1884. (No model.)

*To all whom it may concern:*

Be it known that we, JAMES N. STARK and GEORGE P. BARTLETT, of Woburn, in the county of Middlesex and State of Massachusetts, have invented certain Improvements in Trusses, of which the following is a specification.

This invention has for its object to provide improved means for securing the pad of a hernial truss to the spring that encircles the body, so that the pad may be inclined in any desired direction and secured in any position to which it may be adjusted.

To this end the invention consists in the improved clamping or securing devices whereby the pad may be secured to the spring in different positions, as we will now proceed to describe and claim.

Figure 1:
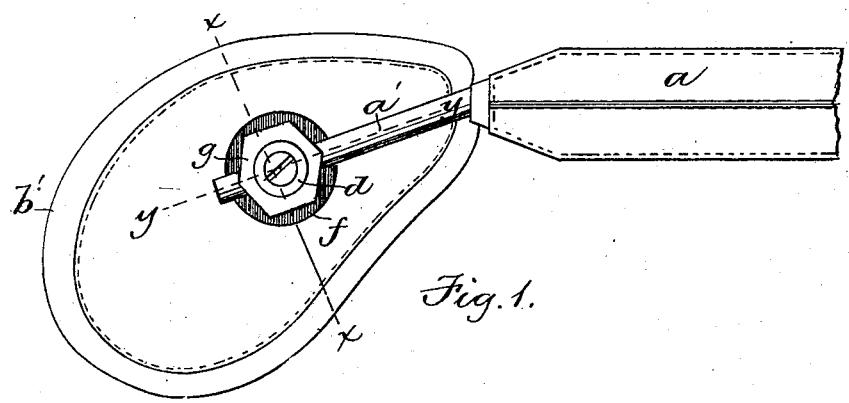
Figures 2, 3, 4:
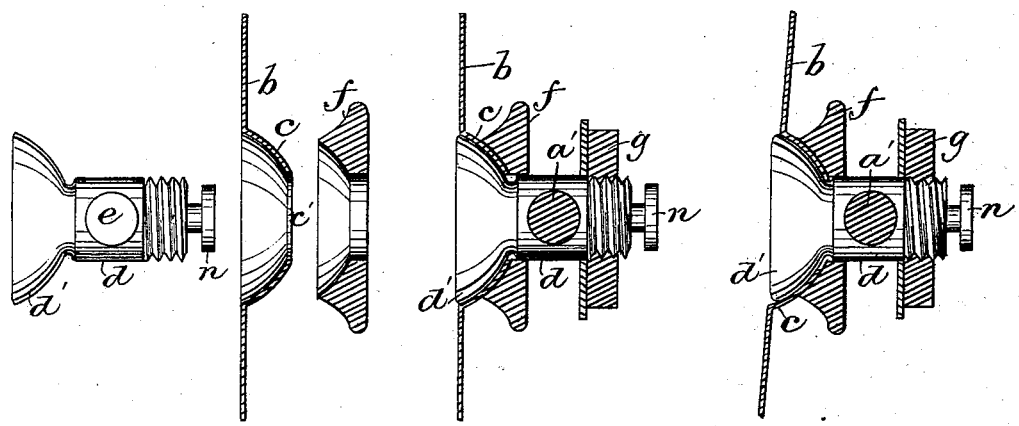
Figures 5, 6:
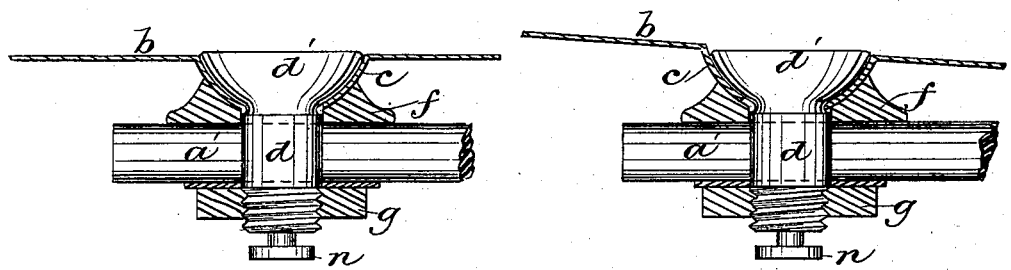

Of the accompanying drawings, forming a part of this specification, Figure 1 represents a view of the outer side of the pad and a portion of the spring to which the pad is attached. Figs. 2 and 3 represent enlarged sections on line $x\ x$, Fig. 1, showing the pad in different positions. Fig. 4 represents in disconnected form the parts shown in Figs. 2 and 3. Figs. 5 and 6 represent sections on line $y\ y$, showing the pad in different positions. In all of said figures except Fig. 1 the base of the pad is shown without its cushion or yielding covering.

The same letters of reference indicate the same parts in all the figures.

In the drawings, $a$ represents the spring body-encircling band of a hernial truss, having rigidly attached to one end the usual cylindrical metal rod or shank, $a'$.

$b$ represents the metal plate, which comprises the base or body of the pad, and has a suitable yielding covering, $b'$, (shown in the drawings only in Fig. 1,) said covering being omitted in the other figures to avoid confusion. The plate $b$ is provided with a concavo-convex boss or socket, $c$, having a central aperture, $c'$.

$d$ represents a bolt having a head, $d'$, which is convex on its inner side, and is adapted to fit the concave side of the boss $c$. The bolt has an orifice, $e$, which receives the shank $a'$.

$f$ represents a washer, which is adapted to be placed on the bolt $d$ between the shank $a'$ and the boss $c$. Said washer is concaved at one side, so as to fit the convex side of the boss, as shown.

The outer end of the bolt $d$ is screw-threaded and provided with a nut, $g$, which is adapted to be screwed onto the bolt and bear against the shank $a'$, the latter being thus pressed against the washer $f$, which in turn is pressed against the boss $c$, so that the shank is clamped tightly between the nut and washer, and the boss is clamped tightly between the washer and the head of the bolt. The pad is thus rigidly secured to the shank, and may be adjusted so as to stand at any desired angle with relation to the shank, the orifice in the boss $c$ being considerably larger than the bolt, so that the plate can be inclined crosswise, as shown in Fig. 3, or lengthwise, as shown in Fig. 6, or at any intermediate angle, the nut $g$ being loosened to permit each adjustment and tightened to secure the pad in the position to which it is adjusted. We prefer to make the orifice in the boss $c$ longest in the direction of the length of the rod, so that the pad can be inclined longitudinally or in the direction indicated in Fig. 6 by adjusting it between the bolt-head and washer to a greater extent than it can be inclined laterally or in the direction indicated in Fig. 3.

Any desired lateral inclination of the pad may be effected by turning or inclining the bolt on the rod, the nut being loosened to permit such turning and afterward tightened to secure the bolt.

It will be seen that the described devices enable the pad to be adjusted conveniently to any desired position, and to be firmly held wherever adjusted.

$n$ represents a headed stud inserted in the end of the bolt $d$, and serving as a button to secure the strap at the opposite end of the spring $a$. Said stud may be screw-threaded and extended inwardly in a threaded socket in the bolt far enough to enable its inner end to bear against the shank $a'$ and assist in clamping the bolt to the shank; or, if preferred, the threaded stud may be used as a substitute for the nut, the latter being dispensed with.

We claim—

A truss-pad having a concavo-convex apertured boss combined with a bolt of smaller diameter than the aperture of said boss, having a convex inner surface on its head adapted to fit the concave side of the boss, a washer having a concave surface adapted to fit the convex side of the boss, the truss-spring shank passing through an orifice in the bolt and bearing against the washer, and a nut or its equivalent engaged with the bolt and adapted to bear against said shank, as set forth.

In testimony whereof we have signed our names to this specification, in the presence of two subscribing witnesses, this 12th day of May, 1884.

JAMES N. STARK.
GEORGE P. BARTLETT.

Witnesses:
T. M. PARKER,
C. F. BROWN.